United States Patent [19]
Stockhausen et al.

[11] Patent Number: 5,642,703
[45] Date of Patent: Jul. 1, 1997

[54] INTERNAL COMBUSTION ENGINE WITH INTAKE AND EXHAUST CAMSHAFT PHASE SHIFTING FOR CYLINDER DEACTIVATION

[75] Inventors: William F. Stockhausen, Northville; Julian A. LoRusso, Grosse Ile, both of Mich.

[73] Assignee: Ford Motor Company, Dearborn, Mich.

[21] Appl. No.: 543,744

[22] Filed: Oct. 16, 1995

[51] Int. Cl.$^6$ ................................................. F02B 77/00
[52] U.S. Cl. ................................................. 123/198 F
[58] Field of Search ........................ 123/198 F, 481, 123/90.15

[56] References Cited

U.S. PATENT DOCUMENTS

| | | | |
|---|---|---|---|
| 3,441,009 | 4/1969 | Rafanelli | 123/90.15 |
| 4,344,393 | 8/1982 | Etoh et al. | 123/198 F |
| 4,365,597 | 12/1982 | Iizuka et al. | 123/198 F |
| 4,401,069 | 8/1983 | Foley | 123/198 F |
| 4,499,870 | 2/1985 | Aoyama | 123/198 F |
| 4,516,542 | 5/1985 | Aoyoma et al. | 123/198 F |
| 4,522,179 | 6/1985 | Nishimura et al. | 123/481 |
| 4,534,323 | 8/1985 | Kato et al. | 123/198 F |
| 4,584,974 | 4/1986 | Aoyama et al. | 123/198 F |
| 5,133,310 | 7/1992 | Hitomi et al. | 123/90.15 |
| 5,190,013 | 3/1993 | Dozier | 123/481 |
| 5,408,966 | 4/1995 | Lipinski et al. | 123/481 |
| 5,467,748 | 11/1995 | Stockhausen | 123/198 F |

*Primary Examiner*—David A. Okonsky
*Attorney, Agent, or Firm*—Neil P. Ferraro

[57] ABSTRACT

A four-stroke cycle, multi-cylinder reciprocating internal combustion engine has a camshaft phaser or phasers for adjusting the timing of the intake and exhaust camshafts with respect to the rotational position of the crankshaft so that some of the cylinders of the engine may be deactivated such that the intake and exhaust valves for each deactivated cylinder open and close at points which are approximately symmetrical about a rotational position of the crankshaft at which the direction of motion of the pistons change.

20 Claims, 4 Drawing Sheets

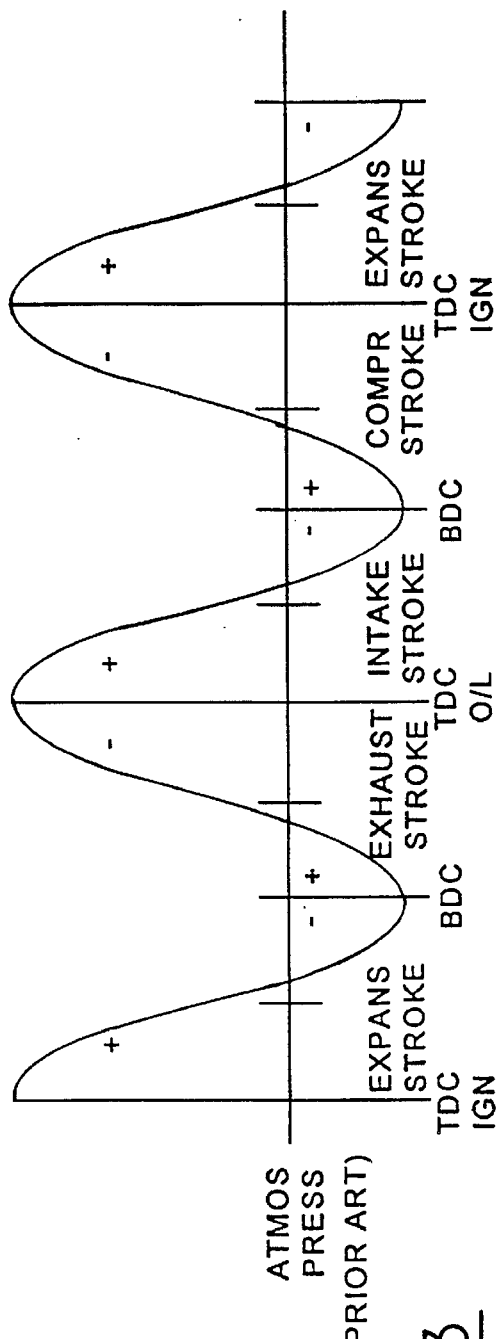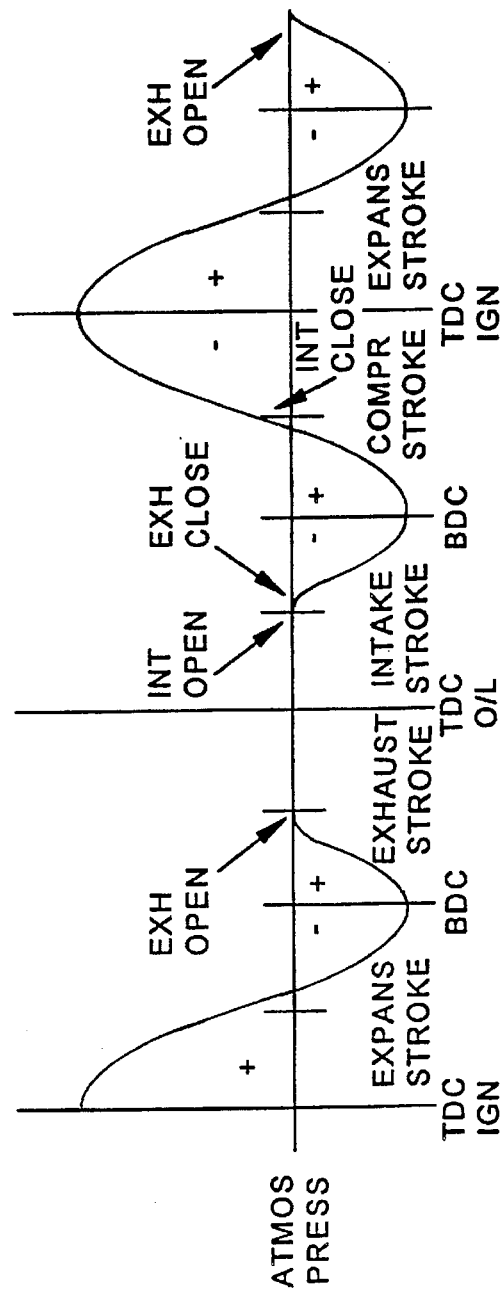

INTERNAL COMBUSTION ENGINE WITH INTAKE AND EXHAUST CAMSHAFT PHASE SHIFTING FOR CYLINDER DEACTIVATION

FIELD OF THE INVENTION

The invention relates to a system and method for selectively deactivating at least some of the cylinders of a reciprocating internal combustion engine, and more particularly to a system and method for camshaft phase shifting of both the intake and exhaust valves.

BACKGROUND OF THE INVENTION

Improved fuel economy may be realized by deactivating part of the cylinders of a multi-cylinder engine and having the remaining cylinders carry the desired load. The primary reason for the fuel economy savings is that the working cylinders operate at a higher specific loading and therefore greater manifold pressure, which results in reduced intake stroke pumping work.

Multi-cylinder engines capable of cylinder deactivation have been produced. Typically, in the case of an in-line 4 cylinder engine, two cylinders are deactivated; in the case of a V-6, three cylinders (one bank) are deactivated. In both cases, cylinder deactivation is effected by disabling both intake and exhaust valves by using individual valve controllers. This causes the piston to compress and expand the trapped mass within the cylinder each revolution of the crankshaft, thereby creating a gas spring. That is, the trapped mass of gas is alternatively compressed and expanded. Engine operation according to this method is shown in FIG. 3 of this specification. Beginning at top dead center location which is noted "TDC" at the point of ignition ("IGN"), the pressure within the cylinder decreases from a super-atmospheric level down through atmospheric during the expansion stroke and ultimately decreases to a sub-atmospheric level at bottom dead center ("BDC"). Then the piston begins its upstroke, or exhaust stroke, and pressure ultimately builds to the same maximum at TDC at overlap ("O/L"). Then, expansion to a sub-atmospheric pressure occurs during the intake stroke as the piston moves down again to the position of BDC and thereafter rises during the compression stroke to TDC of ignition. Because the piston merely compresses and expands the gas which is trapped in the cylinder, the friction and thermodynamic losses are relatively small and the other engine cylinders, which are actually firing, may be operated with sufficiently greater efficiency so that the overall efficiency of the engine is improved. Neglecting heat transfer and piston ring blowby losses, the work done on compression is recovered on expansion so the only work expended is the friction for sliding the piston/ring assembly in the cylinder bore and the connecting rod bearings. And, the mechanical friction of the deactivated cylinders is reduced due to significantly lower peak cylinder pressures. Unfortunately, prior art systems which disable both intake and exhaust valves of an engine's cylinders are quite expensive and are therefore unattractive, because vehicles in which fuel economy is most important are frequently sold in the lower price range, and are therefore unable to command a price sufficient to offset the cost of the added equipment.

A previously filed U.S. patent application (Ser. No. 08/407,523) now U.S. Pat. No. 5,467,748 by the present inventors discloses cylinder deactivation using a wide-range exhaust-only camshaft phase shifter with port throttles. The present invention uses wide range intake and exhaust camshaft phase shifting but does not require port or plenum throttles to work as does the previous invention. The system according to the present invention may have a lower cost because it simply employs an actuator mechanism to phase shift the intake and exhaust camshafts equally on the cylinders to be deactivated. If the valves on the deactivated cylinders are controlled by a single overhead camshaft then the phase shifter is connected to the single camshaft. If the valves on the deactivated cylinders are controlled by dual overhead camshafts, one for the exhausts and one for the intake, then the phase shifter would control both camshafts equally either by providing two phase shifters, one for each camshaft, or a single phase shifter provided that, in the single phase shifter case, the two camshafts are mechanically linked together. Thus, according to the present invention, adjusting the timing of the valve lift events has no effect on the relative timing between the exhaust valve lift event and the intake valve lift event. That is, the timing between exhaust valve and intake valve lift events remains constant, regardless of phase shifting.

Accordingly, an advantage of the invention is to provide a system for cylinder deactivation in order to realize improved fuel economy.

Another advantage of the present invention is to provide a system for lowering peak cylinder pressure in a deactivated cylinder thereby reducing friction, heat transfer and blowby losses.

Still another advantage of the present invention is to provide a lower cost system for cylinder deactivation which employs a mechanism to phase shift the intake and exhaust camshafts equally on the cylinders to be deactivated.

SUMMARY OF THE INVENTION

According to the invention, there is provided a four-stroke cycle, multi-cylinder reciprocating internal combustion engine having a crankshaft and a plurality of pistons reciprocably contained within a plurality of cylinders, said engine comprising at least one intake poppet valve and at least one exhaust poppet valve for each engine cylinder; a camshaft for operating said intake valves and said exhaust valves; a camshaft phaser coupled to said camshaft for adjusting the timing of the camshaft with respect to the rotational position of the crankshaft; and, a controller, connected to said camshaft phaser, for deactivating at least some of the cylinders by operating said camshaft phaser such that for the cylinders which are to be deactivated, the camshaft timing is adjusted such that said intake valve and said exhaust valve open and close at points which are approximately symmetrical about a rotational position of the crankshaft at which the direction of motion of the cylinder's piston changes.

According to the invention there is also provided a method for operating a multi-cylinder, four-stroke cycle reciprocating internal combustion engine on fewer than the maximum number of cylinders, comprising the steps of sensing a plurality of engine and vehicle operating parameters, including at least engine load and engine speed; comparing the sensed operating parameters with predetermined threshold values; issuing a fractional engine cylinder o operation command in the event that the sensed parameters exceed said threshold values so as to deactivate at least one cylinder of said engine; and, adjusting the timing of at least one camshaft which operates poppet intake and exhaust valves of the cylinders to be deactivated so that valve lift events for both intake and exhaust valves are shifted out of phase of standard timing.

According to the invention there is also provided a four-stroke cycle, multi-cylinder reciprocating internal combustion engine having a crankshaft and a plurality of pistons reciprocably contained within a plurality of cylinders, said engine comprising at least one intake popper valve and at least one exhaust popper valve for each engine cylinder; at least one camshaft for operating said intake valves and said exhaust valves; a camshaft phaser for adjusting camshaft timing with respect to the rotational position of the crankshaft; and, a controller for deactivating at least some of the cylinders by operating said camshaft phaser such that for each cylinder which is to be deactivated, the camshaft is adjusted such that valve lift events for both intake and exhaust valves are shifted out of phase of standard timing.

Other objects, features and advantages of the present invention will be readily appreciated by the reader of this specification.

As used herein, the terms "intake stroke," "exhaust stroke," "compression stroke," and "expansion stroke" are meant to refer to these conventional strokes which are known to those skilled in the art of internal combustion engines, and these strokes are referred to in a conventional fashion even when the cylinder is deactivated. This is done for the convenience of understanding the points in the cycle of engine operation wherein various events occur according to the present invention.

BRIEF DESCRIPTION OF THE DRAWINGS

The invention will now be described, by of example, with reference to the accompanying drawings, in which:

FIG. 3 is a diagram showing cylinder pressure and crankshaft position with a prior art cylinder deactivation system;

FIG. 4 is a diagram showing cylinder pressure and crankshaft position of an engine having one variant of a system according to the present invention;

DETAILED DESCRIPTION OF THE PREFERRED EMBODIMENTS

Figure 1:
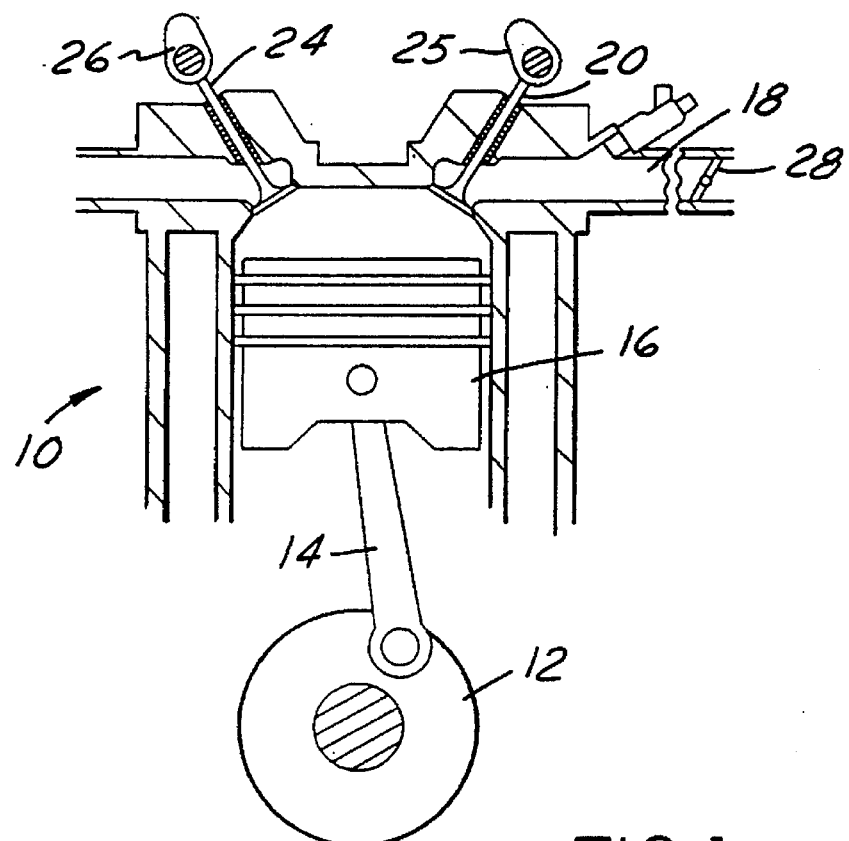
FIG. 1 is a schematic representation of an engine equipped with a cylinder deactivation system according to the present invention.

As shown in FIG. 1, one cylinder of a multi-cylinder, four-stroke cycle reciprocating internal combustion engine 10 has crankshaft 12 with connecting rod 14 and piston 16. Air that has been regulated by throttle 28 located upstream of the cylinder flows into the cylinder through intake port 18, which is controlled by intake valve 20. Exhaust gases exit the cylinder through exhaust port 22 after flowing past exhaust valve 24. Exhaust valve 24 is operated by exhaust camshaft 26. As may be seen in FIG. 1, ingress and egress of air into and out of the engine may be controlled by adjusting the timing of intake camshaft 25 and exhaust camshaft 26, respectively. The adjustment of timing of intake camshaft 25 and exhaust camshaft 26 will produce cylinder pressure histories of the types shown in FIGS. 4–6. FIG. 1 shows an engine having a dual overhead camshaft. However, as will be apparent to those skilled in the art in view of the present invention, a single overhead cam may be used to adjust the timing of both intake valve 20 and exhaust valve 24.

Figure 2:
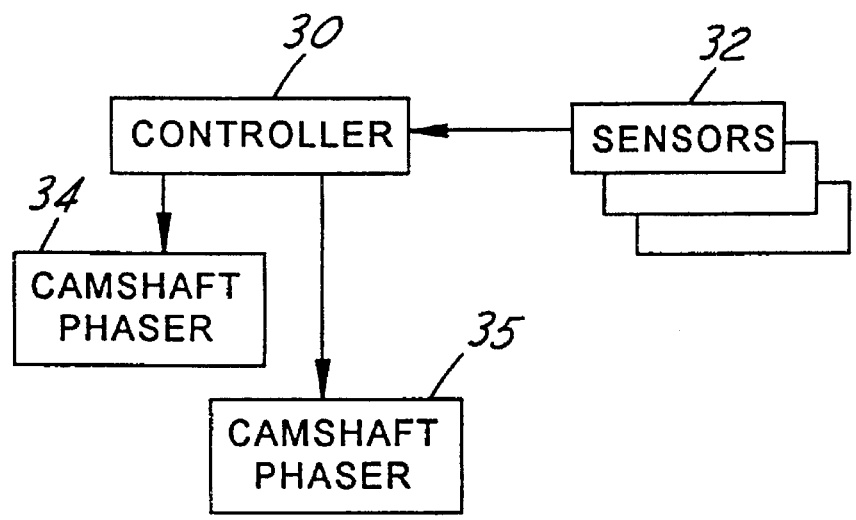
FIG. 2 is a block diagram of a control system according to the present invention.

FIG. 2 illustrates a control system according to the present invention. Controller 30 receives a variety of inputs from engine operating sensors 32 which include many of the types of sensors known to those skilled in the art of engine control and suggested by this disclosure. Accordingly, sensors 32 may include engine speed, engine lead, intake manifold absolute pressure, engine intake air mass flow rate, engine temperature, vehicle speed, vehicle gear selection, throttle position, accelerator position, and other parameters known to those skilled in the art and suggested by this disclosure. The fact remains that there are many conditions in which it is desirable to operate an engine with less than the maximum number of cylinders, and, as noted above, the purpose of the present invention is to allow such fractional operation. As further shown in FIG. 2, controller 30, which may comprise an electronic engine operating controller drawn from many of the types known to those skilled in the art of automotive electronic engine controllers, is connected with camshaft phaser 34. As previously stated, one camshaft phaser is required when using a single overhead cam to actuate both intake valve 20 and exhaust valve 24. However, in the case of a dual overhead cam, a second camshaft phaser 35 may be required. Alternatively, both camshafts may be linked together with one phaser. Thus, according to the present invention, adjusting the timing of valve lift events has no effect on the relative timing between exhaust valve lift event and intake valve lift event. That is, the timing between exhaust valve and intake valve lift events remains constant, regardless of phase shifting. For the sake of clarity, only the dual overhead camshafts with independent camshaft phasers example will be described hereinafter.

Controller 30 compares sensed operating parameters with predetermined threshold values. For example, in a typical control algorithm, cylinder deactivation would not be used unless engine speed exceeds a minimum threshold value and engine load is less than a minimum threshold value. In this sense, the term "exceed" is used herein to mean that the value of the sensed parameter may either be greater than or less than the threshold value. In the event that sensed parameters exceed threshold values, controller 30 will command camshaft phasers 34 and 35 to move to adjust or shift the timing of camshafts 25 and 26 which operate intake valve 20 and exhaust valve 24, respectively, to achieve the timing shown in either of FIGS. 4–6 as will be described. On the cylinders to be deactivated, the camshafts (25 and 26) that are retarded approximately 90° from standard timing use a wide-range phase shifter. The exact amount of timing retard must be determined experimentally; but a controlling factor is that the intake event must be approximately centered (symmetric) about BDC and the exhaust event approximately centered about TDC. As would be apparent to one of ordinary skill in the art in view of this disclosure, the camshafts 25 and 26 may also be phased about 90° advanced of standard timing to achieve the same result.

Figure 5:
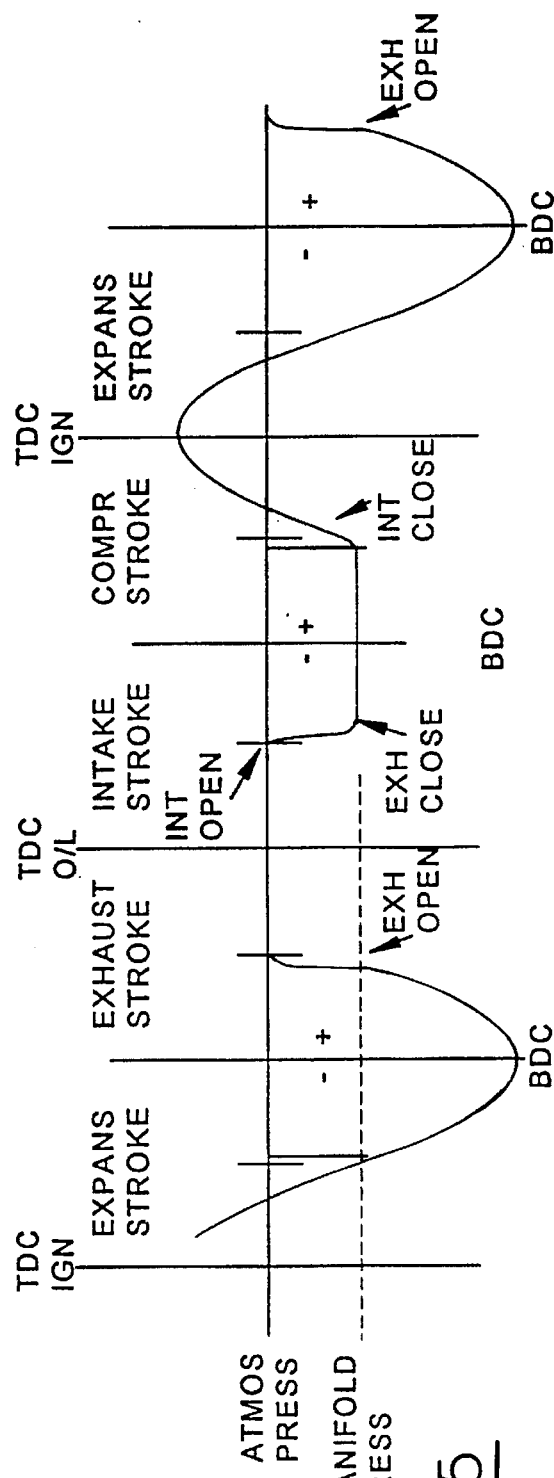
FIG. 5 is a second diagram of cylinder pressure and crankshaft position of an engine having an alternative intake plenum design according to the present invention.
Figure 6:
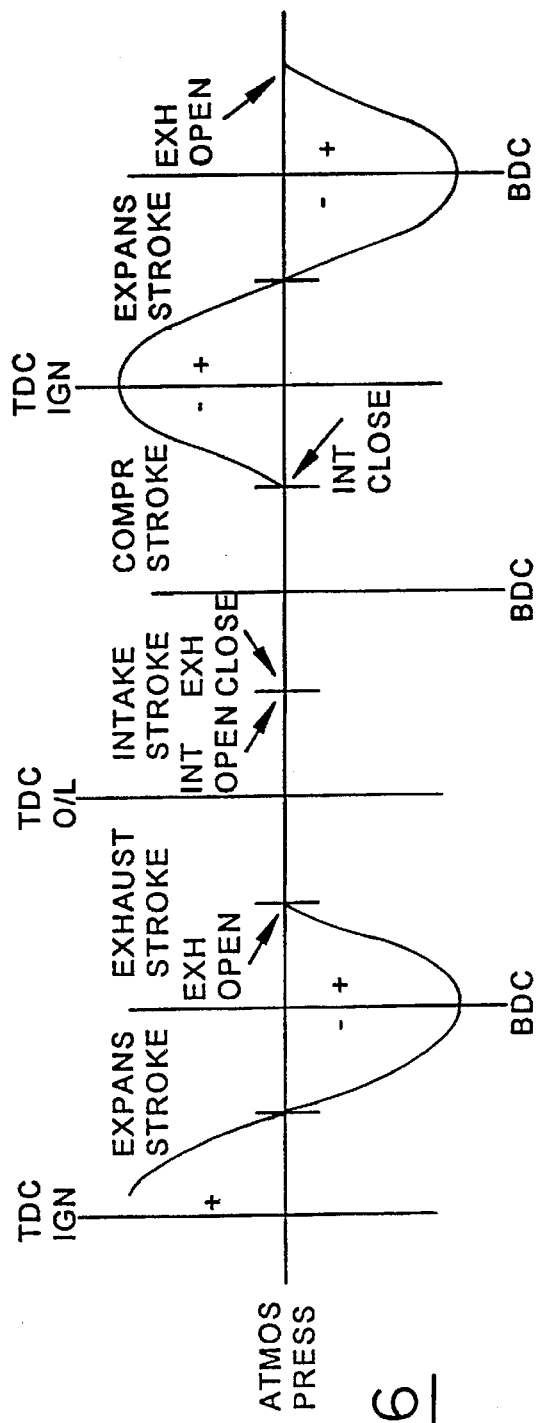
FIG. 6 is a third diagram of cylinder pressure and crankshaft position of an engine having an alternative intake plenum design according to the present invention.

FIG. 3 shows the cylinder pressure vs. piston/crank position for a prior art system where both the intake and exhaust valves are disabled. Here, the piston/cylinder assembly essentially forms an air spring where the work done by the piston (+) is offset by the work done on the piston (−) resulting in zero net work. FIGS. 4–6 show the cylinder pressure vs. piston/crank position according to the present invention. FIGS. 7a–7d show a variety of intake manifold plenum designs which result in the different pressure curves of FIGS. 4–6.

Comparing FIGS. 3–6, it may be seen that in all cases, pressure within the engine's cylinders changes from a negative value at BDC on the expansion stroke to roughly atmospheric pressure during the exhaust stroke. With the prior art system of FIG. 3, which is characterized by disablement of both the intake and exhaust valves of the cylinder using a complex system of components for each individual cylinder, cylinder pressure continues to increase above the atmospheric level, until a maximum value is reached at TDC. This maximum value is the same for TDC at overlap and TDC at ignition.

Figure 7A:
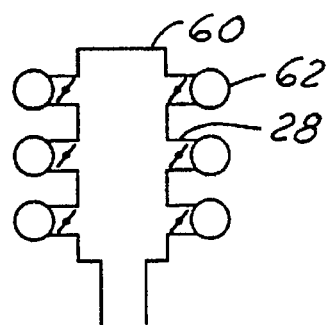
FIGS. 7a–7d are schematic illustrations of alternative intake manifold plenum designs according to the present invention.

In contrast to the prior art system shown in FIG. 3, in an engine having a system according to the present invention, as shown in FIGS. 4 and 7a (camshaft phaser for both intake and exhaust valves and individual port throttles), the atmospheric pressure which is reached on the exhaust stroke is maintained through a portion of the intake stroke until the exhaust valve closes. Thereafter, pressure decreases to a sub-atmospheric pressure at BDC of the intake stroke and once again increases during the compression stroke to a super-atmospheric value which is then reduced during the expansion stroke, which follows the compression stroke. Because the pressure buildup from subatmospheric to atmospheric, which occurs as the piston moves from BDC to TDC on the exhaust stroke is reduced to the same sub-atmospheric pressure during the subsequent expansion to BDC on the intake stroke, the net effect is that the work required to compress the gases within the cylinder is extracted during expansion of the intake stroke, and as a result, very little energy is dissipated within the engine cylinder. Low consumption of energy is aided for the additional reason that controller 30 adjusts the timing of intake and exhaust valves 20 and 24 without the need for either closing port throttles 28 or individual deactivation of the intake or exhaust valves as described with reference to the prior art. This prevents pumping losses which would occur if air were drawn through the intake system during the period in which the cylinders were deactivated. Those skilled in the art will appreciate in view of this disclosure that a variety of camshaft phaser mechanisms could be employed for the purpose of providing camshaft phasers 34 and 35. For example, U.S. Pat. No. 5,107,804 discloses but one of a plurality of camshaft phaser mechanisms which could be employed in a system according to the present invention. FIG. 7a shows a schematic representation of a V-6 engine having individual port throttles 28 for each cylinder 62. The result of phase shifting both intake and exhaust camshafts (25 and 26), according to the present invention, together with providing individual port throttles 28, results in the pressure curve of FIG. 4. The system according to the present invention does not require a closure of port throttle 28 to effect cylinder deactivation. However, some small amount of throttling losses may occur depending upon the position of port throttles 28 during deactivation. Assuming that throttles 28 of FIG. 7a are mechanically linked together, their position would be a function of the demand on the firing cylinders. Thus, due to the firing cylinders having to carry the load, port throttles 28 would be opened wider. This will tend to minimize any of these aforementioned throttling losses.

Figure 7B:
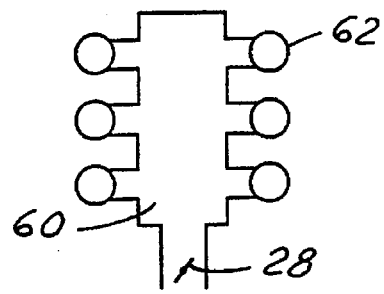
Figure 7C:
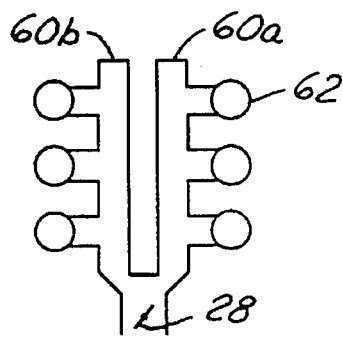

In FIGS. 5, 7b and 7c, the atmospheric pressure which is reached on the exhaust stroke is maintained through a portion of the intake stroke until the intake valve opens and exhaust valve closes. Thereafter, pressure quickly decreases to a sub-atmospheric pressure (the level of which is dictated by the pressure in intake manifold plenum 60) until the exhaust valve closes. Then, the pressure in the cylinder is maintained at intake manifold pressure through BDC of the intake stroke and once again increases during the compression stroke to a super-atmospheric value which is then reduced during the expansion stroke, which follows the compression stroke. The positive and negative work areas in FIG. 5 are equal on either side of TDC or BDC with the exception of the two shaded areas shown which offset each other. The mass that is drawn into the cylinder in the later part of the intake stroke is pushed back out during the first part of the compression stroke. The mass that is pushed out of the cylinder in the later part of the exhaust stroke is drawn back in during the first part of the intake stroke. Thus, there is no net mass flow through the deactivated cylinders, thereby eliminating the need for any dedicated throttle, throttle controller or flow shut off valve for the deactivated cylinders. Depending on the relative pressures in the intake and exhaust manifolds, some backflow will occur during the valve overlap period part way through the intake stroke. This could be remedied by adjusting the nominal camshaft phasing with slightly less retard so as to provide for the same amount of forward intake charge flow to offset the backflow due to the overlap. FIG. 7b shows an intake manifold having a single plenum 60 and single throttle 28. With this configuration, the deactivated cylinders experience the same manifold pressure as the firing cylinders that are carrying the load. Thus, plenum 60 must be large enough so that the intake pulsing caused by the deactivated cylinders would not disrupt the operation of the firing cylinders. However, a means to provide isolation between the firing and deactivated cylinders is shown in FIG. 7c where separate plenums (60a and 60b) combined only near the main common throttle 28 is used. Phase shifting both intake and exhaust camshafts (25 and 26) according to the present invention while using either of the plenum designs of FIGS. 7b and 7c result in the pressure curve of FIG. 5. Either plenum design (FIGS. 7b and 7c) would result in the virtual elimination of net cycle pumping work for the deactivated cylinders.

Figure 7D:
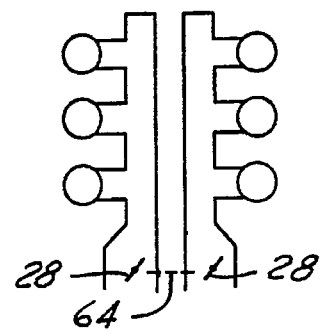

In FIGS. 6 and 7d, the atmospheric pressure which is reached on the exhaust stroke is maintained through the entire intake stroke and through a portion of the compression stroke until the intake valve closes. Thereafter, pressure increases during the compression stroke to a super-atmospheric value which is then reduced during the expansion stroke, which follows the compression stroke. FIG. 7d shows separate intake plenums (60a and 60b) with dual main throttles 28 mechanically linked by linkage 64. This arrangement produces the pressure curve of FIG. 6. Again, the net pumping work is virtually zero and there is no net flow through the deactivated cylinders. Because the firing cylinders and the deactivated cylinders are fed from separate plenums (60a and 60b, respectively), there is no communication between firing and deactivated cylinders and therefore no interference (pulsing) is possible as in the common plenum 60 of FIG. 7b.

Figure 8:
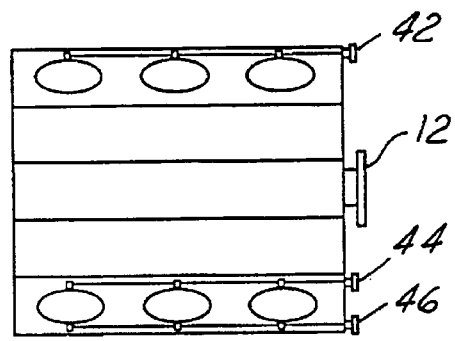
FIG. 8 is a schematic representation of a V-type of engine suitable for use with the present invention; and, FIG. 9 is a schematic representation of an inline type of engine suitable for use with the present invention.
Figure 9:
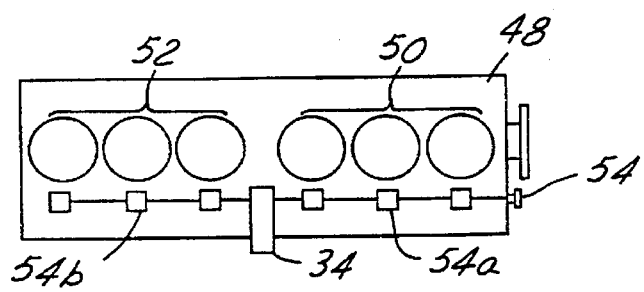

FIG. 8 is a schematic representation of a V-type of engine (in this case, a V-6) having a system according to the present invention. Those skilled in the art will appreciate in view of this disclosure that a system according to this invention could be used in a V-6 or V-12 engine, or, for that matter, a V-8 engine if the V-8 engine is equipped with a co-planar crankshaft. In FIG. 8, camshaft 42 comprises a single camshaft for one bank of cylinders of the engine, with camshaft 42 operating both intake and exhaust valves. The bank of cylinders associated with camshaft 42 may be deactivated by single camshaft phaser 34 (not shown) which would be applied to one end of camshaft 42. Conversely, a single phase shifter 34 (not shown) may be applied to both camshafts 44 and 46. Alternatively, two phase shifters, 34 and 35, (not shown) could each be applied to camshafts 44 and 46, respectively. Further, those skilled in the art will appreciate in view of this disclosure that other types of driving arrangements could be used for camshafts according to the present invention, including that shown in FIG. 9, in which an inline, single overhead camshaft engine 48 has a front group of cylinders 50 and a rear group of cylinders 52. Phaser 34 is applied between the front portion of camshaft 54a, and a rear portion of camshaft 54b. As before, camshaft phaser is controlled by controller 30 and will advance or retard the camshaft as commanded by controller 30 to achieve operation of the engine with disabled cylinders according to the present invention. Of course, phaser 34 may be applied to two camshafts in the case of a dual overhead camshaft engine. Alternatively, a second phaser, namely phaser 35 (not shown), may be applied to the second camshaft of the dual overhead camshaft engine.

While the invention has been shown and described in its preferred embodiments, it will be clear to those skilled in the arts to which it pertains that many changes and modifications may be made thereto without departing from the scope of the invention.

We claim:

1. A four-stroke cycle, multi-cylinder reciprocating internal combustion engine having a crankshaft and a plurality of pistons reciprocably contained within a plurality of cylinders, said engine comprising:

at least one intake poppet valve and at least one exhaust poppet valve for each engine cylinder;

a camshaft for operating said intake valves and said exhaust valves;

a camshaft phaser coupled to said camshaft for adjusting the timing of the camshaft with respect to the rotational position of the crankshaft; and, a controller, connected to said camshaft phaser, for deactivating at least some of the cylinders by operating said camshaft phaser such that for the cylinders which are to be deactivated, the camshaft timing is adjusted such that said intake valve and said exhaust valve open and close at points which are approximately symmetrical about a rotational position of the crankshaft at which the direction of motion of the cylinder's piston changes.

2. An engine according to claim 1, wherein said engine comprises two camshafts mechanically linked together, one camshaft operates said intake valves and the other camshaft operates said exhaust valves, with each said camshaft being coupled to said camshaft phaser.

3. An engine according to claim 1, wherein said engine comprises two camshafts, one camshaft operates said intake valves and the other camshaft operates said exhaust valves, and a second camshaft phaser is coupled to one of said camshafts such that each of said camshafts is coupled to an associated camshaft phaser.

4. An engine according to claim 1, wherein said intake valve opens and closes in approximately the same number of crankangle degrees about the piston's bottom dead center position at the conclusion of the intake stroke.

5. An engine according to claim 1, wherein said exhaust valve opens and closes in approximately the same number of crankangle degrees about the piston's top dead center position at the conclusion of the exhaust stroke.

6. An engine according to claim 1, wherein said controller lo operates said camshaft phaser such that said camshaft is retarded approximately 90° out of phase of standard timing.

7. An engine according to claim 1, wherein said controller operates said camshaft phaser such that said camshaft is advanced approximately 90° out of phase of standard timing.

8. An engine according to claim 1, wherein said engine is a v-type having two banks of cylinders, with each said bank having a separate intake and exhaust camshaft and an associated camshaft phaser, with said controller operating the camshaft phaser of one of said banks of cylinders such that all of the cylinders of such bank are deactivated.

9. An engine according to claim 1, wherein said engine is a v-type having two banks of cylinders, with each said bank having a single camshaft for both the intake and exhaust valves and an associated camshaft phaser, with said controller operating the camshaft phaser of the of said banks of cylinders such that all of the cylinders of such bank are deactivated.

10. An engine according to claim 1, wherein said engine is an inline type having a front group of cylinders and a rear group of cylinders, with each said group having a separate intake and exhaust camshaft and an associated camshaft phaser, with said controller operating the camshaft phaser of one of said groups of cylinders such that all of the cylinders of such group are deactivated.

11. An engine according to claim 1, wherein said engine is an inline type having a front group of cylinders and a rear group of cylinders, with each said group having a single camshaft for both the intake and exhaust valves and an associated camshaft phaser, with said controller operating the camshaft phaser of one of said groups of cylinders such that all of the cylinders of such group are deactivated.

12. An engine according to claim 1 further comprising an intake lo manifold having a single plenum and port throttles upstream of each said intake valve for each said cylinder such that the pressure in said cylinder is approximately maintained at atmospheric pressure when said piston is part way through an exhaust stroke and part way through an intake stroke.

13. An engine according to claim 1 further comprising an intake manifold having a common plenum and a single throttle such that the pressure in said cylinder is approximately maintained at an intake manifold pressure when said piston is at the end of an intake stroke and part way through a compression stroke.

14. An engine according to claim 1 further comprising an intake manifold having separate plenums combined near a single throttle such that the pressure in said cylinder is approximately maintained at an intake manifold pressure when said piston is at the end of an intake stroke and part way through a compression stroke.

15. An engine according to claim 1 further comprising an intake manifold having separate intake plenums, each said plenum having a throttle wherein said throttles are linked together such that the pressure in said cylinder is approximately maintained at atmospheric pressure when said piston is at the end of an exhaust stroke, through an intake stroke and part way through a compression stroke.

16. A method for operating a multi-cylinder, four-stroke cycle reciprocating internal combustion engine on fewer than the maximum number of cylinders, comprising the steps of:

sensing a plurality of engine and vehicle operating parameters, including at least engine load and engine speed;

comparing the sensed operating parameters with predetermined threshold values;

issuing a fractional engine cylinder operation command in the event that the sensed parameters exceed said threshold values so as to deactivate at least one cylinder of said engine; and, adjusting the timing of at least one camshaft which operates poppet intake and exhaust valves of the cylinders to be deactivated so that valve lift events for both intake and exhaust valves are shifted out of phase of standard timing.

17. A method according to claim 16, further comprising the step of stopping the delivery of fuel to the cylinders which are deactivated.

18. A method according to claim 16, wherein said adjusting step comprises the step of retarding intake and exhaust valve lift approximately 90° out of phase of standard timing.

19. A method according to claim 16, wherein said adjusting step comprises the step of advancing intake and exhaust valve lift approximately 90° out of phase of standard timing.

20. A four-stroke cycle, multi-cylinder reciprocating internal combustion engine having a crankshaft and a plurality of pistons reciprocably contained within a plurality of cylinders, said engine comprising:

at least one intake popper valve and at least one exhaust poppet valve for each engine cylinder;

at least one camshaft for operating said intake valves and said exhaust valves;

a camshaft phaser for adjusting camshaft timing with respect to the rotational position of the crankshaft; and, a controller for deactivating at least some of the cylinders by operating said camshaft phaser such that for each cylinder which is to be deactivated, the camshaft is adjusted such that valve lift events for both intake and exhaust valves are shifted approximately 90° out of phase of standard timing.

* * * * *